United States Patent
Fink et al.

(10) Patent No.: US 9,555,671 B2
(45) Date of Patent: Jan. 31, 2017

(54) METHOD AND DEVICE FOR MONITORING DATA RELATING TO THE TIRES OF A VEHICLE

(75) Inventors: Alexander Fink, Oakland Township, MI (US); Nicolas Guinart, Toulouse (FR); Gregor Kuchler, Regensburg (DE); Jürgen Spotka, Regenstauf (DE); Marc Pflugmann, Rain (DE)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 367 days.

(21) Appl. No.: 13/982,064

(22) PCT Filed: Feb. 10, 2012

(86) PCT No.: PCT/EP2012/000606
§ 371 (c)(1),
(2), (4) Date: Oct. 4, 2013

(87) PCT Pub. No.: WO2013/037431
PCT Pub. Date: Mar. 21, 2013

(65) Prior Publication Data
US 2014/0019035 A1    Jan. 16, 2014

(30) Foreign Application Priority Data
Feb. 11, 2011 (EP) .................................. 11352002

(51) Int. Cl.
*B60C 23/00* (2006.01)
*B60C 23/06* (2006.01)
*G01M 17/013* (2006.01)

(52) U.S. Cl.
CPC ............. *B60C 23/00* (2013.01); *B60C 23/061* (2013.01); *G01M 17/013* (2013.01)

(58) Field of Classification Search
CPC ........ B60C 23/00; B60C 23/061; G01M 17/013
See application file for complete search history.

(56) References Cited

U.S. PATENT DOCUMENTS

| 5,922,949 A | 7/1999 | Nakajima |
| 5,923,244 A | 7/1999 | Jones |

(Continued)

FOREIGN PATENT DOCUMENTS

| JP | 06-8713 | 1/1994 |
| JP | 2000-233615 | 8/2000 |

(Continued)

OTHER PUBLICATIONS

International Search Report, dated Apr. 5, 2012, from corresponding PCT application.

*Primary Examiner* — Dale W Hilgendorf
(74) *Attorney, Agent, or Firm* — Young & Thompson (57) ABSTRACT

In a method for determining identifiers of wheel units and positions relative to the vehicle of the wheels on which the wheel units are fitted, the vehicle is equipped with a speed sensor for each wheel and elements for transmitting at a predetermined angular position of the corresponding wheel about its axis a message including the identifier of the wheel unit. A central processing unit receives the message and information from the speed sensors. The method includes a) counting, for each identifier, of a number "nt" of receptions of the identifier, b) statistical processing of the numbers "nt" to determine candidate identifiers of a wheel unit of the vehicle, until the number of candidate identifiers at least equals the number of wheels, and c) determining that a candidate identifier is the identifier of a wheel unit if the candidate identifier meets a predetermined criterion.

10 Claims, 6 Drawing Sheets

(56) References Cited

U.S. PATENT DOCUMENTS

| | | | |
|---|---|---|---|
| 6,112,587 A | 9/2000 | Oldenettel | |
| 6,435,020 B1 | 8/2002 | Oldenettel et al. | |
| 6,518,877 B1 * | 2/2003 | Starkey | B60C 23/0433 340/447 |
| 6,591,671 B2 * | 7/2003 | Brown | B60C 23/0408 340/445 |
| 7,032,441 B2 * | 4/2006 | Kanatani | B60C 23/0416 73/146 |
| 7,230,525 B2 * | 6/2007 | Hirai | B60C 23/061 340/445 |
| 8,332,104 B2 * | 12/2012 | Greer | B60C 23/0416 340/445 |
| 2004/0021562 A1 * | 2/2004 | Prenninger | B60C 23/0416 340/445 |
| 2010/0083747 A1 | 4/2010 | Fink et al. | |

FOREIGN PATENT DOCUMENTS

| | | |
|---|---|---|
| JP | 2005-335654 | 12/2005 |
| JP | 4212609 | 1/2009 |
| JP | 2010-122023 | 6/2010 |
| WO | 03-086788 | 10/2003 |
| WO | 2009/070065 A1 | 6/2009 |

\* cited by examiner

Fig 2

METHOD AND DEVICE FOR MONITORING DATA RELATING TO THE TIRES OF A VEHICLE

BACKGROUND OF THE INVENTION

Field of the Invention

The invention relates to a system for monitoring data from vehicle tires, for example a tire pressure monitoring system and more particularly a method for determining the position (on the vehicle) of a tire having a unique identification number (ID). This tire position can be each of the following positions: front left (FL), front right (FR), rear left (RL), rear right (RR).

Description of the Related Art

Known tire pressure monitoring systems (TPMS) comprise a wheel unit installed in each wheel, a reception antenna on the vehicle, and a central processing unit fitted to the vehicle to monitor the pressures of the tires. Each wheel unit comprises a transmitter to transfer the data from sensors installed in the wheel units. Said sensors can be chosen from a group comprising: a pressure sensor which measures the internal air pressure of the tire, a temperature sensor which measures the temperature of the air inside the tire, an angular position sensor, an accelerometer, etc. Other sensors can be present in the wheel unit to detect faults or to measure other parametric values associated with the tires or wheels. To each wheel unit, there is assigned a unique identifier ID transmitted via radio with data measured by this sensor to the vehicle reception antenna of the vehicle, then to the vehicle central processing.

The identifier (ID) is initially memorized in the central processing unit, and associated with the position of the corresponding wheel. The central processing unit can generate information relating to the tires or alert messages intended to be displayed for the driver, for example in the case of low tire pressure. If a vehicle remains motionless for a relatively long duration, the assignment of the identifier ID to a position on the vehicle is restarted since one or more tires may have changed place or the tires may have been inverted while the vehicle was immobile.

Certain known tire pressure monitoring systems can perform position assignment (locating) of respective air pressure sensors automatically, i.e. without specific actions by the driver. In a known process, each wheel housing is equipped with a triggering unit. Each triggering unit successively transmits an activation signal. The wheel units successively respond to the triggering units, thus learning their identifier ID and determining their position simultaneously. These methods, which explicitly implement the initialization process (recognition of identifiers related to the vehicle) and the locating process in a single step are generally associated with increased component costs and with a relatively overall system high degree of complexity.

With a reduced number of components, the method is carried out in two stages. In the first stage, generally called the "initialization" stage, the vehicle identifiers are collected. In the second stage, a wheel position is assigned to each collected identifier. The second stage is generally called the "locating" stage.

The initialization function is mainly based on statistical steps. An increasing number of vehicles are equipped with tire pressure monitoring systems. However, the number of radio frequencies is limited. Thus, it can arise that when one vehicle moves close to another, the receiver of one of the vehicles receives the identifiers from the other vehicle wheels. The initialization function is based on the assumption that the transmissions of identifiers of correct vehicle wheel units are received more frequently than the neighboring vehicle identifiers. Once the identifiers are collected, the accuracy of the result can be assessed and robustness improved by evaluating additional information.

For example, all the wheel units of the same vehicle should have substantially the same rotation speeds (if the vehicle moves in a straight line at a steady speed) and approximately similar temperature profiles. It is also possible to assess the intensities of the received signals. However, the described approaches can lead to false conclusions or to no conclusion at all if two or more vehicles move one beside the other or one behind the other for a relatively long period of time. This can arise when the vehicle is in heavy traffic conditions.

The locating of new tire positions, carried out after each relatively long stoppage of the vehicle, has the main drawback of the tire pressure monitoring system being occupied for a relatively long time for the correct assigning of identifiers and of wheel units corresponding positions, before the system can evaluate the measured air pressures in the normal operating mode and assign them to a corresponding wheel unit position on the vehicle. Hence, the driver, in the event that the air pressure in a specific tire falls, may be warned late.

Often, the vehicle has already left a parking spot when a pressure alert message is displayed. The driver must then stop the vehicle at an awkward place or drive for a longer time with an incorrect air pressure before being able to solve the tire problem. Either case constitutes a real safety risk.

BRIEF SUMMARY OF THE INVENTION

Consequently, an object of the invention is to provide an improved and more rapid method of correlation of the wheel units received identifiers with positions of said units relative to a vehicle after interruptions in its driving.

Another object of the invention is to execute the method with a reduced number of components. The method uses only an angular sensor and sensors which are already present on the vehicle to perform other functions.

To this end, according to a first aspect, the invention relates to a method for determining identifiers of vehicle wheel units and positions relative to the vehicle of the wheels on which said wheel units are fitted, the vehicle being equipped with a speed sensor for each wheel, each wheel unit being equipped with means for transmitting at a predetermined angular position of the corresponding wheel around its axis a message including the identifier of the wheel unit, a central processing unit receiving said message and information from said speed sensors, the method comprising the following steps:

a) counting, for each identifier, of a number "nt" of receptions of said identifier, b) statistical processing of the numbers "nt" in order to determine from among all the identifiers received those which are most probably the identifier of a wheel unit of the vehicle, the identifiers becoming candidate identifiers for the vehicle, the statistical process ending when the number of candidate identifiers is at least equal to the number of vehicle wheels, c) determining that a candidate identifier is the identifier of a wheel unit if said candidate identifier meets a predetermined criterion relating to at least one instant of reception of said candidate identifier and to the angular position of a wheel at said instant, and assigning to the corresponding wheel the position relative to the vehicle of the speed sensor supplying said angular position.

In a first embodiment of step b), an identifier is accepted as candidate identifier if, for said identifier, the number "nt" is greater than a first predetermined threshold value and if the number of different identifiers for which the number "nt" is greater than said first predetermined threshold value is at least equal to the number of vehicle wheels.

In a second embodiment of step b), an identifier is accepted as candidate identifier if, for said identifier, the number "nt" is greater than an average value "ani" of the numbers "nt" and if the number of different identifiers for which the number "nt" is greater than "ani" is at least equal to the number of wheels of the vehicle.

Said average number "ani" is the sum of all the numbers "nt" of each identifier divided by the number of different identifiers.

In one embodiment of step c), the criterion is: whether or not a candidate identifier has been received during a second predetermined duration starting after the end of step b) as a synchronized identifier a greater number of times than a second predetermined threshold value. A synchronized identifier is an identifier which is received when the corresponding wheel has performed a whole number of revolutions since a last reception of the same identifier.

In another embodiment of step c), for each wheel, a histogram comprising angular intervals between the positions of the wheels, between −180° and +180°, is constructed. For each candidate identifier, one of the intervals for each wheel, corresponding to the number of synchronized transmissions, related to the hit rate, is incremented by "one". Said interval is the angular interval at which the wheel is located, when the candidate identifier is received. In this embodiment of step c), the criterion for accepting a candidate identifier ID and for locating the identifier relative to vehicle is that a ratio between a second and a first smaller value representative of angular dispersions is greater than a third predetermined threshold value. The third predetermined threshold value can be representative of the variance or standard deviation.

In this embodiment of step c), the criterion can be: whether or not a ratio, between a second and a first smaller value representative of a dispersion of different current angular positions calculated for each current received candidate identifier and for each vehicle wheel unit, for one of the wheel units, is at least equal to the third predetermined threshold value, a current angular position being the angular position at which a current identifier is received.

According to a second aspect, the present invention aims to provide a device for determining identifiers (initialization) of vehicle wheel units and positions relative to the vehicle of the wheels on which said wheel units are fitted (locating), the vehicle being equipped with a speed sensor for each wheel, each wheel unit being equipped with means for transmitting at a predetermined angular position of the corresponding wheel about its axis a message including the identifier of the wheel unit, a central processing unit receiving said message and information from said speed sensors, characterized in that it comprises:

a) a means of counting, for each identifier, of a number "nt" of receptions of said identifier, b) a means of statistical processing of the numbers "nt" in order to determine from among all the identifiers received those which are most probably the identifiers of vehicle wheel units, said identifiers becoming candidate identifiers for the vehicle, the statistical process ending when the number of candidate identifiers is at least equal to the number of wheels of the vehicle, and c) a means of determining that a candidate identifier is the identifier of a wheel unit if said candidate identifier meets a predetermined criterion relating to at least one instant of reception of said candidate identifier and to the angular position of a wheel at said instant, and of assigning to the corresponding wheel the position relative to the vehicle of the speed sensor supplying said angular position.

It will be noted that according to the invention, it is not expected that the initialization procedure has enabled to find the n identifiers corresponding to the vehicle n wheels in order to proceed to the locating procedure. In fact, the initialization procedure is stopped as soon as there is a number of identifiers assumed to belong to the vehicle greater than or equal to the number n of wheels. These identifiers are called candidate identifiers. It is the locating procedure which is then responsible for sorting from these identifiers those which belong to the vehicle and those which do not.

Other objectives and features of the present invention will emerge from reading the following detailed description considered with reference to the accompanying drawings. It will be noted however that the drawings do not in any way limit the scope of the invention.

BRIEF DESCRIPTION OF THE DRAWINGS

In the drawings, in which similar reference characters denote similar components in all the various views.

DETAILED DESCRIPTION OF THE PREFERRED EMBODIMENTS

Figure 1:
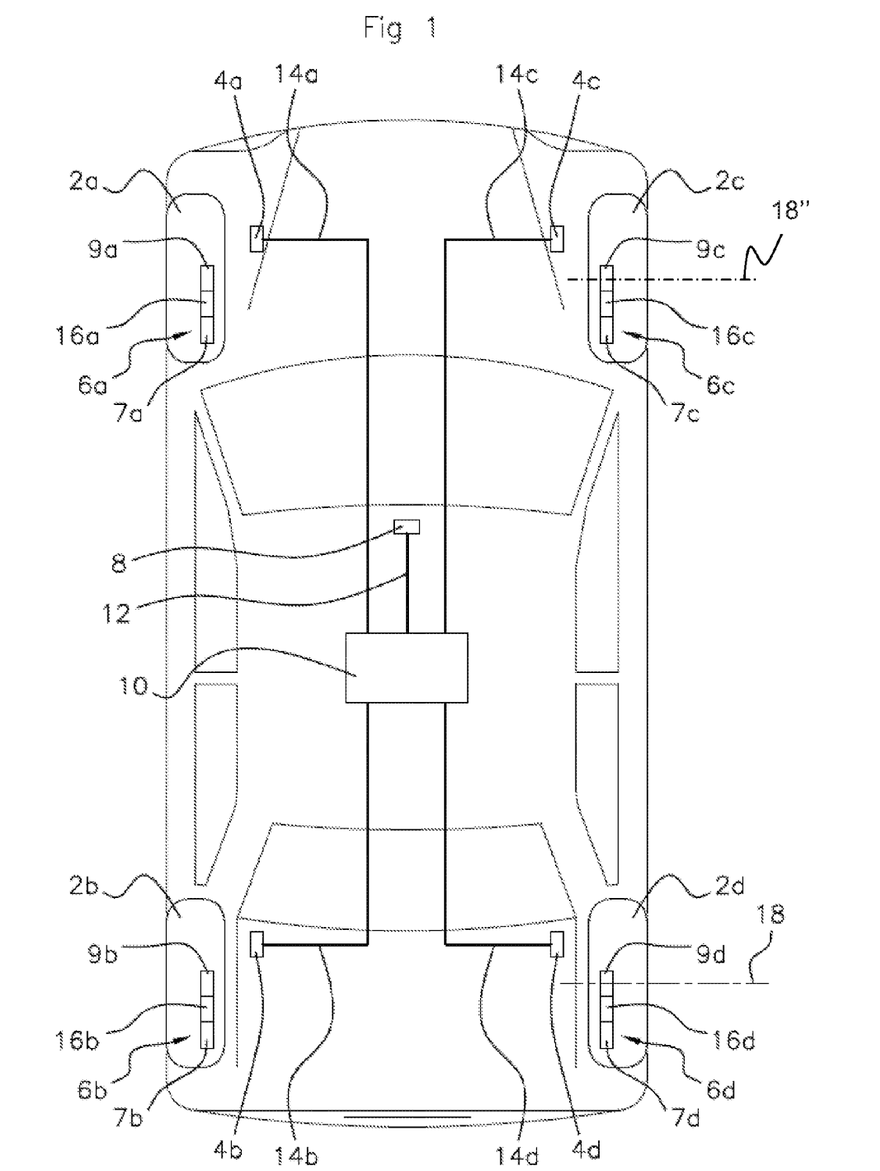
FIG. 1 is a block diagram of a tire pressure monitoring system that can be used with the invention.

FIG. 1 schematically shows a vehicle including wheels 2a to 2d, each wheel able to turn around an axis 18. The vehicle includes a tire pressure monitoring system which in turn includes wheel units 6a to 6d. Each wheel unit includes a pressure sensor, 7a to 7d respectively, fitted to the tire of the wheel, 2a to 2d respectively, of the vehicle. For example, the pressure sensor is located inside the tire tube or is associated with the tire tube valve. The wheel units 6a to 6d include transmitters, 9a to 9d respectively, which provide for transmitting data to a contactless receiver 8 (an antenna).

Furthermore, the wheel units 6a to 6d include angular sensors, 16a to 16d respectively. Each angular sensor 16a to 16d provides for recognizing at least one fixed angular position of the wheel around its axis 18. Each angular sensor can have the shape of a flexible component as described, for example in U.S. Pat. No. 6,112,587 in the name of Continental (registered trademark).

The receiver 8 transmits the data received from the wheel units 6a to 6d to a central processing unit 10, via a transmission channel 12. In the simplest case, the receiver 8 is configured as a receiving antenna with the aid of which the central processing unit 10 receives the transmitted data.

The tire pressure monitoring system uses rpm (revolutions per minute) speed sensors 4a to 4d which are fixed to the vehicle and associated with the respective wheels 2a to 2d of the vehicle. The speed sensors can for example form part of an anti-lock braking system (ABS). The speed sensors 4a to 4d communicate with the processing unit 10 via transmission channels 14a to 14d respectively. The processing unit 10 knows, for example from the data stored in a memory, the wheel positions associated with the respective speed sensors 4a to 4d. The processing unit 10 knows, for example, that the speed sensor 4a is assigned to the "front left" wheel position of the vehicle.

Each wheel unit transmits a message only when the wheel is in a predetermined angular position. Said predetermined angular position is identified by data from the angular position sensors 16a to 16d. Thus, between two messages from the same wheel, the wheel has necessarily carried out a whole number of revolutions. Each message comprises an identifier ID of the wheel unit and data from sensors fitted in this wheel unit associated with the corresponding wheel.

To determine the identifiers ID (initialization procedure) of the vehicle wheel units and their positions (locating procedure) relative to the motor vehicle, a central processing unit receives said message and information from said speed sensors. The method for initializing the wheel units identifiers ID and for assigning a position (locating) to each wheel unit relative to the vehicle comprises the following steps:

a) counting, for example over a first predetermined duration or at any moment, for each identifier, of a number "nt" of receptions of said identifier, b) statistical processing of the numbers "nt" in order to determine from among all the identifiers received those which are most probably the identifier of a vehicle wheel unit, the identifiers becoming candidate identifiers for the vehicle, the statistical process ending when the number of candidate identifiers is at least equal to the vehicle number of wheels, (and not when the number of candidate identifiers is strictly equal to the number of wheels of the vehicle), c) determining that a candidate identifier is the identifier of a wheel unit if said candidate identifier meets a predetermined criterion relating to at least one instant of reception of said candidate identifier and to the angular position of a wheel at said instant, and assigning to the corresponding wheel the position relative to the vehicle of the speed sensor supplying said angular position.

It will be noted that step b) ends most of the time with a number of candidate identifiers greater than the vehicle number of wheels, thereby providing for reducing the duration of the initialization procedure and for starting the locating procedure rapidly.

It will be noted that steps a) and b) are initialization steps and that step c) is a locating step.

Figure 2:
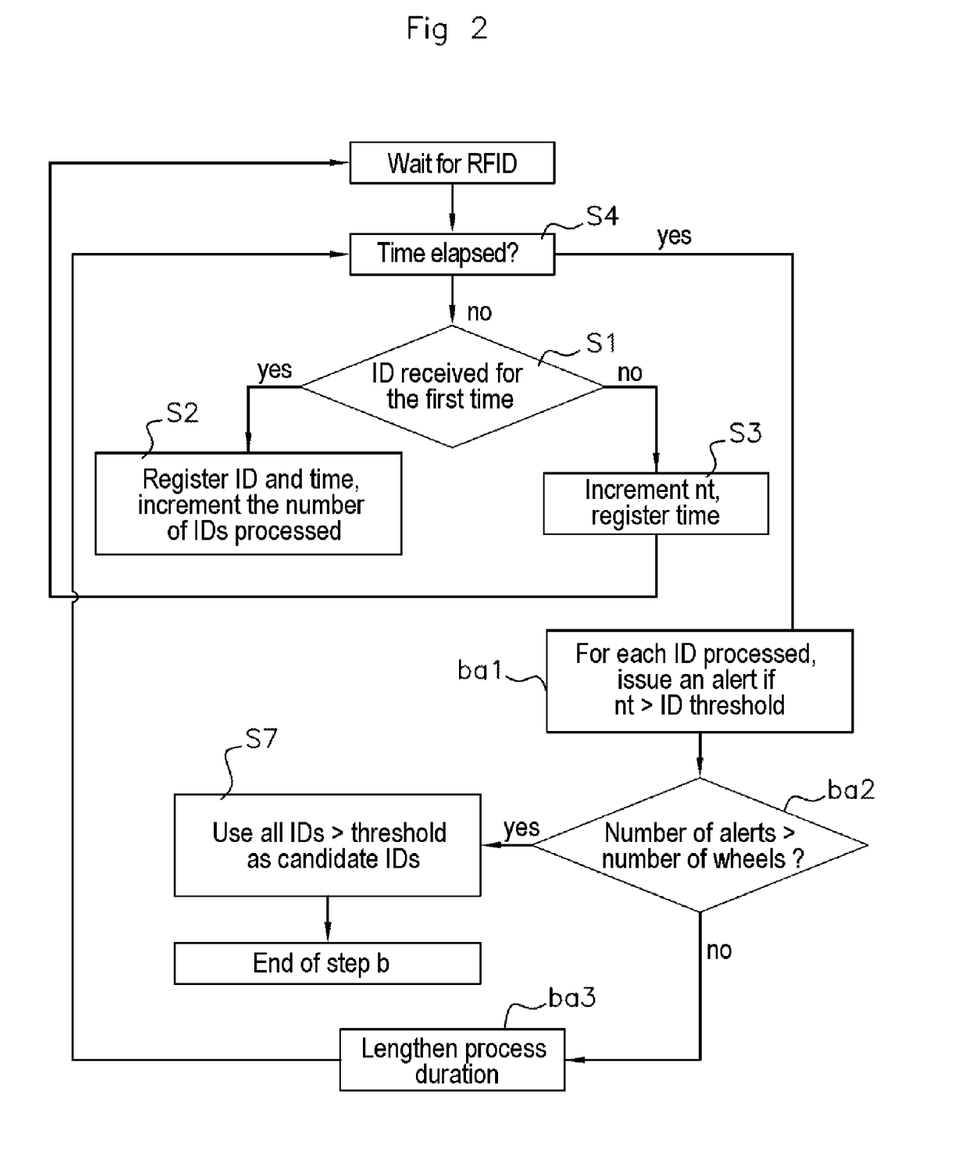
FIG. 2 is a schematic diagram illustrating a first embodiment of steps a) and b) of the method according to the invention in order to obtain candidate identifiers.

One embodiment of step a) is now explained with reference to FIG. 2. For each message received by the processing unit 10, step a) is executed. Step a) comprises the memorization, for example, during a first predetermined duration as in FIGS. 2-3, or at any moment, of each received identifier ID and the counting of a number "nt" of receptions of the same identifier. In the embodiment shown in FIG. 2, step a) comprises steps S1 to S4.

At step S1, a check is made as to whether or not an identifier included in a received message is received for the first time since the start of the first predetermined duration. If it is the first time, then at step S2, the identifier is memorized with the time at which it was received and an identifier count is set to "one" for said identifier. In addition, a number "nID" of different identifiers received is incremented by "one" and memorized.

If the identifier received with a message is not received for the first time during the first predetermined duration, then at step S3 a count "nt" of said identifier is incremented by "one", and the time at which said identifier was received is memorized. Steps S1 to S3 are repeated, for example until the end of the first predetermined duration (said end of the predetermined duration is checked for at step S4) or, in variants, (not shown), continuously. Thus, step a) is limited in time.

When the first predetermined duration has elapsed, step b) is started. A first embodiment of step b) comprising three steps ba1) to ba3) is now described, still with reference to FIG. 2.

At step ba1), an alert concerning each identifier is issued if the corresponding number "nt" is greater than a first threshold value.

A check is carried out at step ba2) as to whether or not the number of alerts issued is at least equal to or greater than the vehicle number of wheels. If yes, all said identifiers are candidate identifiers, and step b) ends without executing step ba3). If not, at step ba3), the program proceeds to step a).

Thus, the initialization steps (a and b) are continued if the number of candidate identifiers is not sufficient. However, they are cut short as soon as the number of candidate identifiers is greater than the vehicle number of wheels (even if it is very well known that some of them do not belong to the vehicle).

Figure 3:
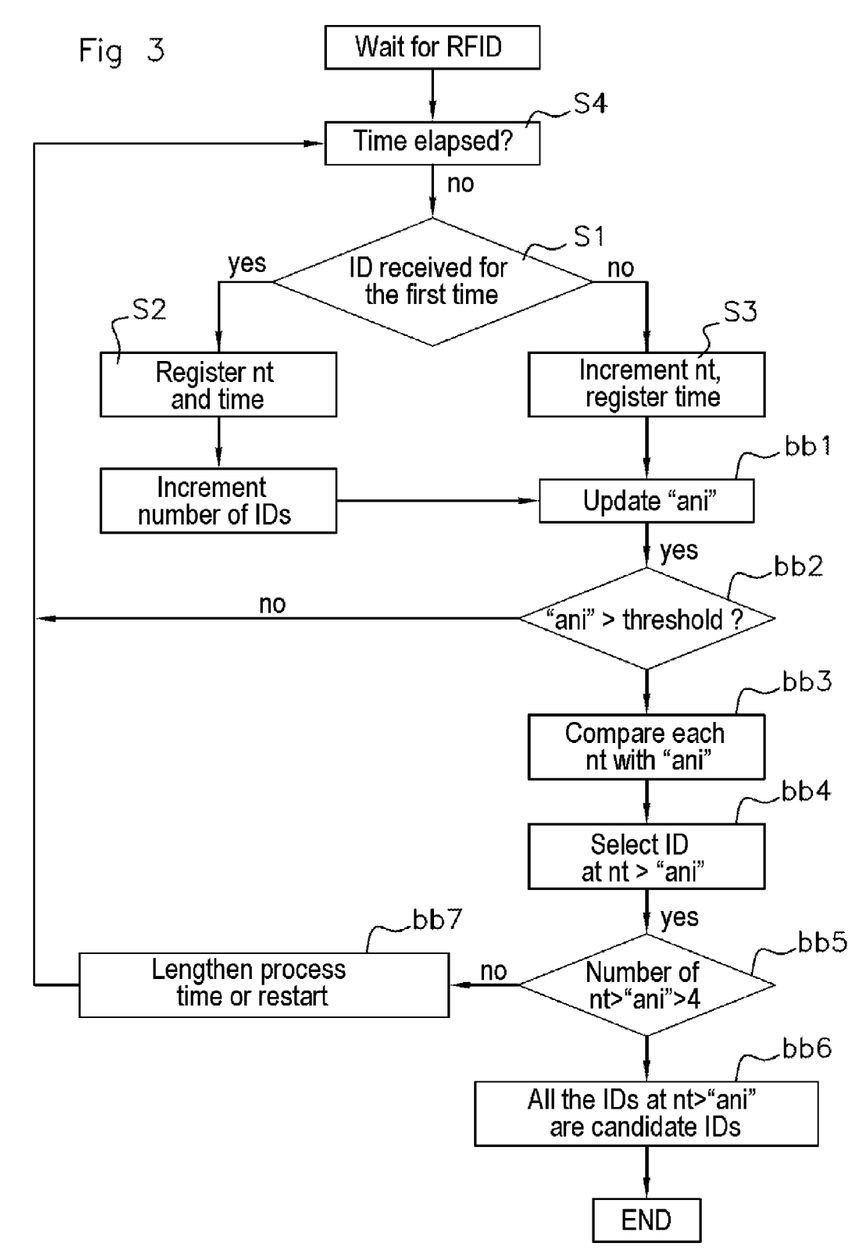
FIG. 3 is a schematic diagram illustrating a second embodiment of steps a) and b) of the method according to the invention in order to obtain candidate identifiers.

Another embodiment of step b) is now described with reference to FIG. 3. In said embodiment, step a) comprises steps S1 to S4 as described with reference to FIG. 2. The statistical analysis process (to determine which are the vehicle identifiers) in this embodiment of step b) comprises the following steps:

bb1) calculation of an average number "ani" as the sum of all the numbers "nt" of all the registered identifiers, divided by the number "nID" of different identifiers, bb2) check as to whether or not "ani" is equal to or greater than a pre-established value, and if not, go to step a). If "ani" is greater than said preset value, the program proceeds to step bb3).

bb3) comparison of each of the numbers "nt" with the average number "ani".

bb4) selection of all the identifiers for which "nt" is at least equal to "ani".

bb5) check as to whether or not the number of selected identifiers is at least equal to the number of wheels (assumed equal to 4, in FIG. 3), bb6) if the number of selected identifiers is at least equal to the number of wheels, decision made that the selected identifiers are candidate identifiers (i.e. they belong to the vehicle) and go to step c).

bb7) if the number of selected identifiers is less than the number of wheels, proceed to step a), i.e. lengthening of the duration of the initialization process (or this process is restarted).

Figure 4:
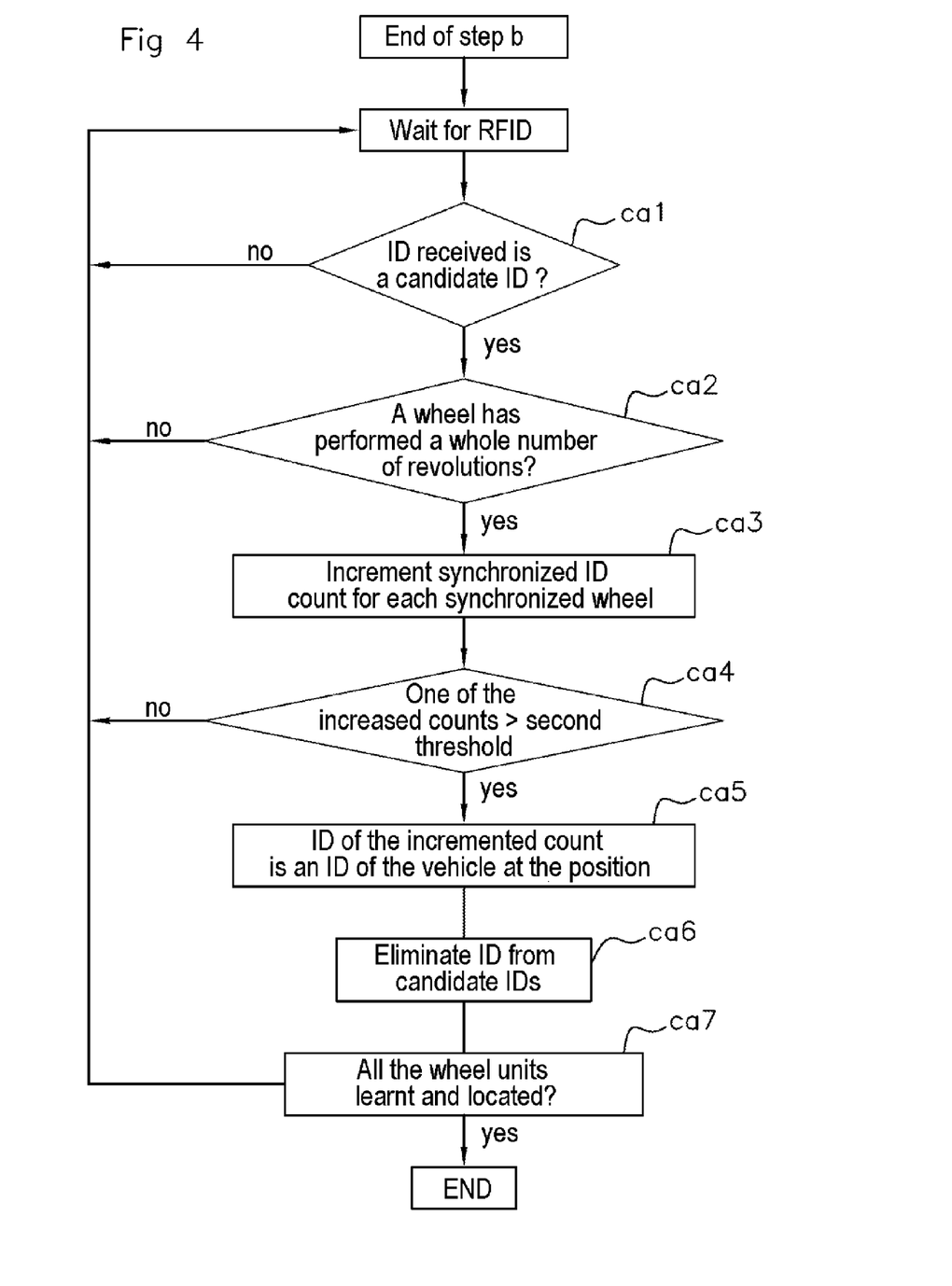
FIG. 4 is a schematic diagram illustrating a first embodiment of step c) of the method according to the invention, to learn the identifiers and the positions of the identifiers relative to the vehicle, by processing only the candidate identifiers.

A first embodiment of step c), called the locating step, is now described with reference to FIG. 4. The used criterion to decide that a candidate identifier is an identifier of a wheel and to assign to this identifier a position on the vehicle is as follows: if a candidate identifier has or has not been received during a second predetermined duration after the end of step b) as a synchronized identifier a number of times greater than a second predetermined threshold value, then this identifier belongs to the vehicle and is associated with a position. A synchronized identifier is an identifier which is received when the corresponding wheel has performed a whole number of revolutions since a last reception of the same identifier. Thus, if the candidate identifier is a synchronized identifier then it belongs to the vehicle and is positioned on it. On the other hand, if it is not a synchronized identifier, it does not belong to the vehicle and is rejected.

In the first embodiment, step c) comprises steps ca1) to ca7).

At step ca1), for each identifier received, a check is made as to whether or not said identifier is a candidate identifier. If not, the received identifier is rejected from the process. If yes, the program proceeds to step ca2).

At step ca2), a check is made as to whether or not at least one of the wheels has performed a whole number of revolutions since the last reception time of the same identifier.

At step ca3), if at least one of the wheels has performed a whole number of revolutions since a last reception of the same identifier, said identifier becomes a synchronized identifier and a synchronized identifier number is incremented by "one" for each identifier for each of the wheel positions which have performed a whole number of revolutions.

At step ca4), a check is made as to whether or not one of the synchronized identifier numbers is greater than a second predetermined threshold value.

At step ca5), if a number of synchronized identifiers becomes greater than the second predetermined threshold value, it is decided that the candidate identifier becomes an identifier of a wheel unit at the position at which the second predetermined threshold value is reached. This identifier is thus a learnt identifier and its position relative to the vehicle is known.

At step ca6), this learnt identifier is eliminated from the candidate identifiers.

At step ca7), the program returns to steps a), b), ca1) to ca6) for the other candidate identifiers and for the wheel units which have not yet been located, until all the wheel units have an identifier and a position.

Another embodiment of step c) is now described with reference to FIGS. 5 and 6.

Figure 6:
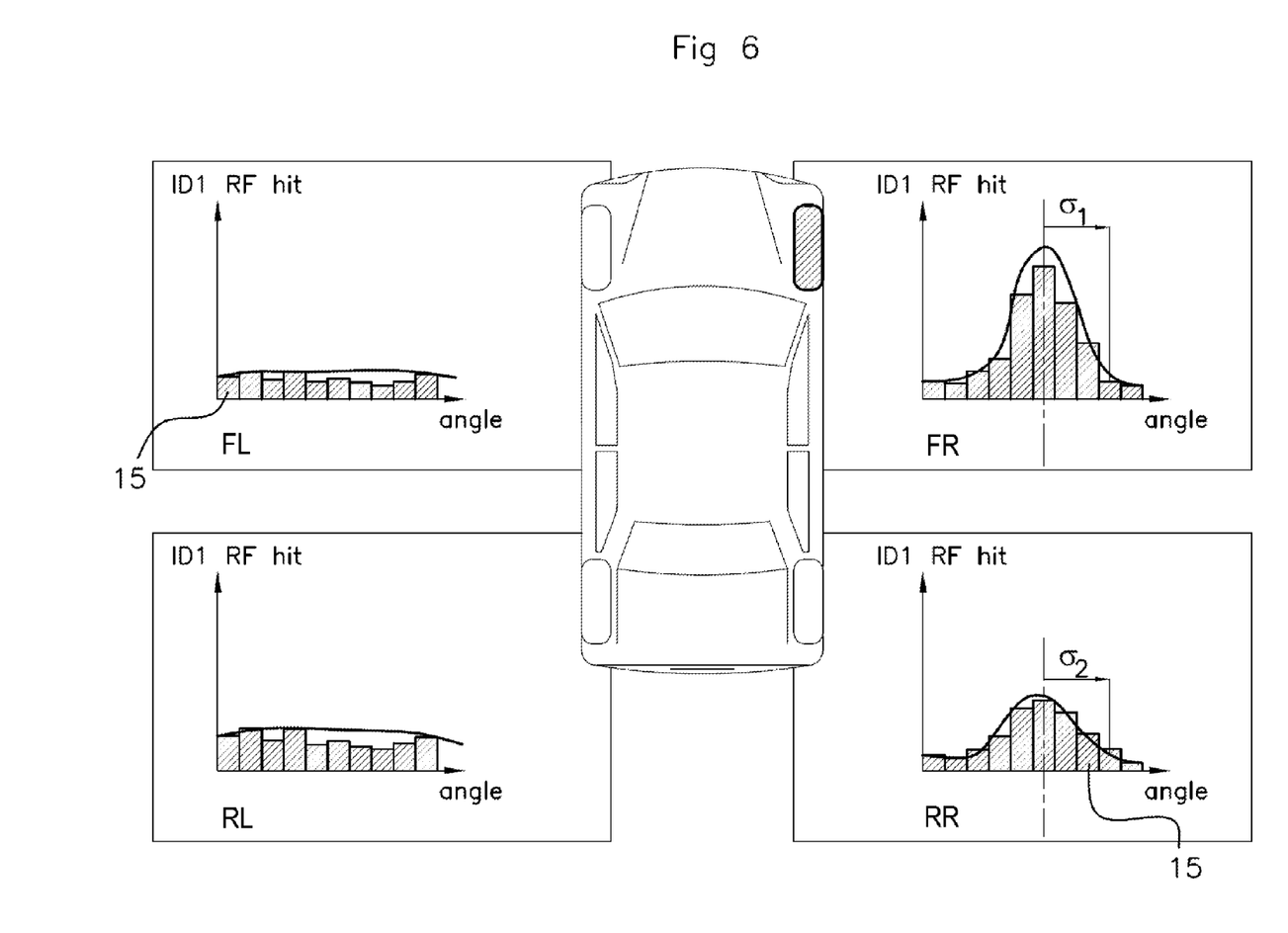

FIG. 6 is a diagram illustrating histograms of hit rates against angular intervals of a candidate identifier and for each of the wheels. The hit rate for a given sensor identifier is the ratio of the number of synchronized transmissions received in the position sector in question, divided by the sum of all the synchronized transmissions received from the sensor in question.

FIG. 6 represents four histograms corresponding to the four positions of the wheels relative to the vehicle. For each wheel, there are as many groups of four histograms as there are number of candidate identifiers obtained at the end of step b). Each histogram is constructed by dividing an angular interval, −180° to +180°, by the angular position of a wheel into continuous and contiguous intervals 15, as represented in FIG. 6.

Figure 5:
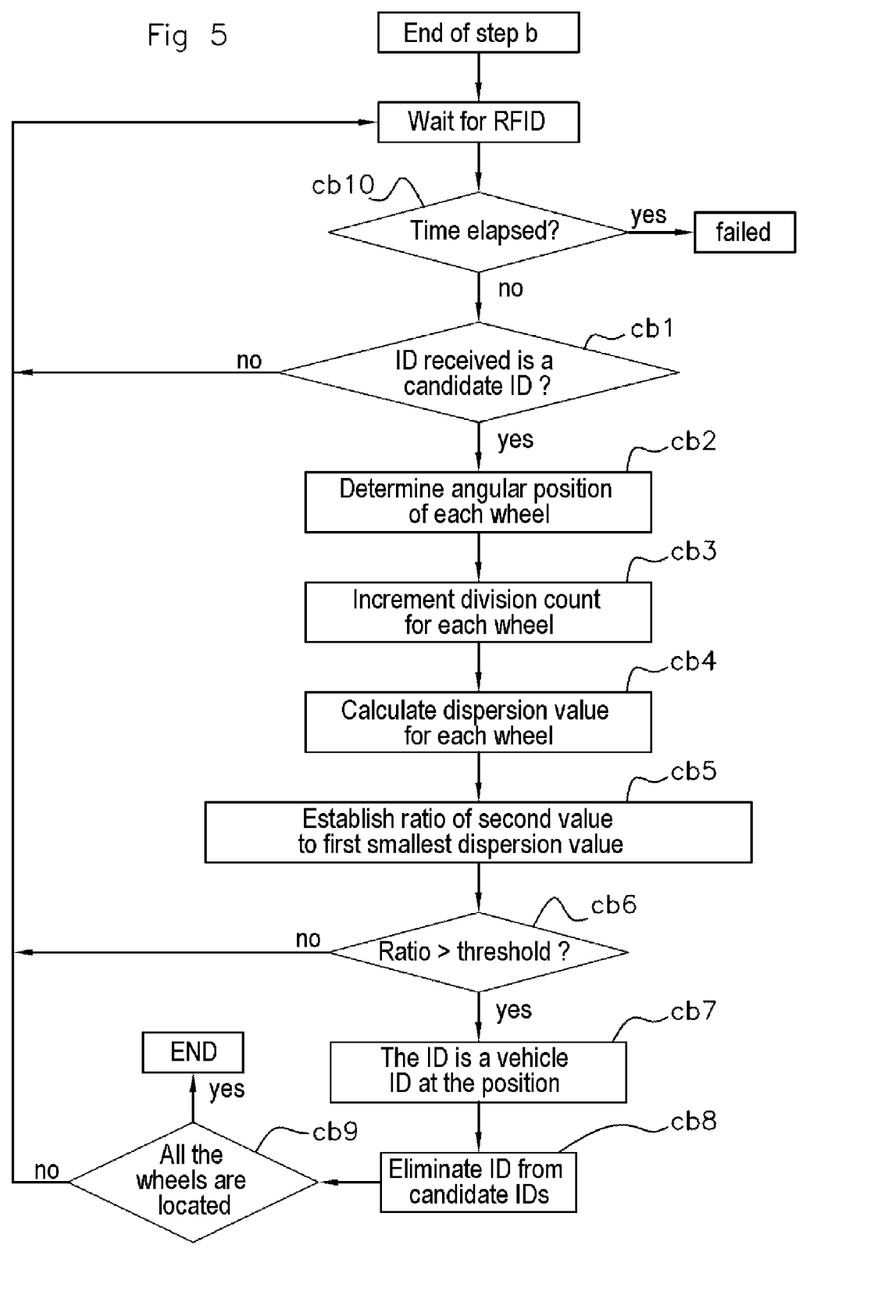
FIG. 5 is a schematic diagram illustrating a second embodiment of step c) of the method according to the invention, to learn the identifiers and the positions of the identifiers relative to the vehicle, by processing only the candidate identifiers and, FIG. 6 is a diagram illustrating histograms of hit rates against angular intervals of a candidate identifier and for each of the wheels. Such histograms are used in the second embodiment of step c).

The method of step c) in accordance with the embodiment is described here with reference to FIG. 5. The method comprises the following steps:

at a step cb1), for each received identifier, a check is made as to whether or not a current received identifier is a candidate identifier. If not, the current received identifier is not processed. If yes, the program proceeds to step cb2).

at step cb2), an angular position (division) of each wheel is determined for the time (instant) at which the current candidate identifier was received, and an angular position is consequently selected for each wheel. The angular position is constructed, for example, from data from the speed sensor $4a$ to $4d$ of each wheel. Said sensors are often designed so as to send a pulse for each increase by a fraction of a revolution of the wheel. For example, 24 pulses are sent for each complete rotation. The number of intervals would be at most in such a case 12 between −180° and 0, and 12 between 0 and +180°. An interval can also be an angular increase corresponding to a whole number of consecutive pulses; for example, each interval can correspond to the reception of three consecutive pulses, so for 24 pulses sent for each complete revolution, the number of intervals would be four between −180° and 0°, and four between 0° and +180°, at a step cb3), a count of each selected position is incremented by "one" for the four histograms dedicated to the current candidate identifier, at a step cb4), a dispersion value $\sigma 1$, $\sigma 2$, $\sigma 3$, $\sigma 4$ is calculated for each of the four histograms. In a preferred embodiment, the calculation is carried out only if the total number of receptions of said current candidate identifier is greater than a predetermined value, at a step cb5), a ratio is established between the first dispersion value and the second smallest dispersion value of the current identifier. For example, in the example shown in FIG. 6, the smallest dispersion value is $\sigma 1$ and the second smallest dispersion value is $\sigma 2$. Hence the calculated ratio is $R = \sigma 2 / \sigma 1$, at a step cb6), the ratio R is compared with a threshold value, at a step cb7), if R is at least equal to the threshold value, the current candidate identifier is considered to be an identifier of the vehicle and the wheel unit responding to said current candidate identifier is positioned at the position corresponding to the dispersion $\sigma 1$. If the ratio is not less than the threshold value, the process continues, at a step cb8), when it has been decided that the current identifier is an identifier of the vehicle, the current identifier is eliminated from the candidate identifiers, at a step cb9), a check is made as to whether or not the four wheels have been learnt and positioned. If not, the process continues for the candidate identifiers which have not yet been eliminated as being a vehicle identifier and for the wheels which have not yet been located. If yes, the process is terminated, and at a step cb10), if the process is not terminated at the end of the predetermined duration starting at the end of step b), the process has failed.

Thus, the initialization and locating are carried out partly at the same time. In fact, when the locating is terminated, the initialization is also necessarily terminated.

It will be noted that in the example described, the initialization stage is a stage carried out by statistical calculations. Thus, the identifiers received most often by the processing unit of the vehicle are considered to be those of the vehicle. A locating stage for the retained identifiers (candidate identifiers) is then executed using the occurrence of a synchronization between the reception of a new message transmitted by the wheel unit and the fact that one of the wheels of the vehicle is found to have performed a whole number of turns between two successive occurrences of the same identifier.

It will be noted that the initialization stage based on statistical calculations can be of a very short duration and in that case the locating stage described is carried out on the one hand to locate the vehicle identifiers and on the other hand to acquire the identifiers of this vehicle.

Indeed, in this case the locating stage takes into account almost all the received identifiers a certain number of times, even if they are in excess compared with the number of vehicle wheels.

The locating of each of the identifiers (by a method for synchronizing the message in which they are contained and because between two messages including this identifier only one of the vehicle wheels has performed a whole number of turns) at the same time provides for carrying out the initialization stage. Specifically, as soon as n identifiers have been successfully located for the positions of the n wheels of the vehicle, these identifiers necessarily belong to the vehicle. Thus the initialization stage is markedly reduced and the locating stage very rapidly arrives at sorting those identifiers which belong to the vehicle and those which do not.

As a variant, it is possible to process all the received identifiers only through the locating stage. In this case, steps a) and b) perform only the collecting of identifiers which are all considered to be candidate identifiers.

The invention claimed is:

1. A method for determining identifiers (ID) of wheel units of a vehicle and positions relative to the vehicle of the wheels on which said wheel units are fitted, the vehicle being equipped with a speed sensor for each wheel, each wheel unit being equipped with means for transmitting at a predetermined angular position of the corresponding wheel around its axis (18) a message including the identifier of the wheel unit, a central processing unit receiving said message and information from said speed sensors, said method comprising the following steps:
    a) counting, for each identifier, of a number "nt" of receptions of said identifier,
    b) statistical processing of the numbers "nt" in order to determine from among all the identifiers received those which are statistically indicated to be the identifier of one of the wheel units of the vehicle, the identifiers becoming candidate identifiers for the vehicle, the statistical process ending when the number of the candidate identifiers is at least equal to the number of wheels of the vehicle, and
    c) determining that each candidate identifier is the identifier of a particular wheel unit if said candidate identifier meets a predetermined criterion relating to at least one instant of reception of said candidate identifier and to the angular position of a particular wheel at said instant, and assigning to the corresponding particular wheel the position relative to the vehicle of the speed sensor supplying said angular position, wherein step c) comprises steps cb1) to cb10), in which
    at step cb1), for each identifier received, a check is made as to whether or not said current received identifier is the candidate identifier; if not, the current received identifier is not processed,
    if yes in step cb1), at step cb2), an angular position of each wheel is determined for the instant at which the current candidate identifier was received, and an angular division of a full interval, −180° to +180°, is consequently selected for each wheel,
    at step cb3), a count of each selected division is incremented by one in the division of each wheel, the count being dedicated to the current candidate identifier,
    at step cb4), a dispersion value σ1, σ2, σ3, σ4 is calculated for each of the constructed histograms by counting the number of identifiers registered in a division,
    at step cb5), a ratio R is established between the first and the second smallest dispersion value for the current identifier,
    at step cb6), the ratio R is compared with a threshold value,
    at step cb7), if R is equal to or greater than the threshold value, the current candidate identifier is considered to be the identifier of the vehicle and the wheel unit responding to said current candidate identifier is positioned at the position corresponding to the smallest dispersion; if the ratio is not equal to or greater than the threshold value, the process continues,
    at step cb8), when it has been decided that the current identifier is the identifier of the vehicle, the current identifier is eliminated from the candidate identifiers,
    at step cb9), a check is made as to whether or not the four wheels have been learnt and positioned; if not, the process continues for the candidate identifiers which have not yet been eliminated as being the identifier of the vehicle and for the wheels which have not yet been located; if yes, the process is terminated, and
    at step cb10), if the process is not terminated at the end of a predetermined duration starting at the end of step b), the process has failed.

2. The method as claimed in claim 1, in which, at step b) the identifier is accepted as the candidate identifier if, for said identifier, the number "nt" is greater than a first predetermined threshold value and if the number of different identifiers for which the number "nt" is greater than said first predetermined threshold value is at least equal to the number of vehicle wheels.

3. The method as claimed in claim 2, in which, at step c), the criterion is:
    whether or not the candidate identifier has been received during the predetermined duration starting after the end of step b) as a synchronized identifier a greater number of times than a second predetermined threshold value, the synchronized identifier being an identifier which is received when the corresponding wheel has performed a whole number of revolutions since a last reception of the same identifier.

4. The method as claimed in claim 1, in which, at step b) the identifier is accepted as the candidate identifier if, for said identifier, the number "nt" is greater than an average value "ani" of the numbers "nt" and if the number of different identifiers for which the number "nt" is greater than "ani" is at least equal to the number of vehicle wheels.

5. The method as claimed in claim 1, in which step b) comprises steps ba1) to ba3), and in which:
at step ba1), registers for each registering of the current number of different identifiers, "nID", are checked and an alert is issued for each identifier each time the number "nt" for one of the identifiers is greater than a first threshold value,
at step ba2), a check is made as to whether or not a number of alerts issued is at least equal to or greater than the number of vehicle wheels, and if yes, all said identifiers are the candidate identifiers and step b) is terminated,
at step ba3), if the condition of step ba2) is not satisfied, steps a) and b) are continued over an additional predetermined duration until the condition of step ba2) is satisfied.

6. The method as claimed in claim 1, in which step b) comprises steps bb1) to bb7), and in which:
at step bb1), an average number "ani" of the numbers "nt" is calculated,
at step bb2), a check is made as to whether or not "ani" is at least equal to a pre-established value, and if not, the program returns to steps a) and bb1) until the average number "ani" is at least equal to said pre-established value,
if "ani" is greater than said pre-established value, at step bb3) each of the numbers "nt" is compared with the average number "ani",
at step bb4), all the identifications for which "nt" is at least equal to "ani" are selected,
at step bb5), a check is made as to whether or not the number of all the selected identifiers is at least equal to the number of wheels,
at step bb6), if the number of the selected identifiers is at least equal to the number of wheels, it is decided that the selected identifiers are the candidate identifiers and step b) is terminated,
if not, at step bb7), if the number of the selected identifiers is less than the number of wheels, the program returns to steps a) and bb1) to bb6) until the number of the selected identifiers is at least equal to the number of wheels.

7. The method as claimed in claim 1, in which, at step c), the criterion is:
whether or not a ratio, between a second and a first smaller value representative of a dispersion of different current angular positions calculated for each current received candidate identifier and for each wheel unit, for one of the wheel units, is equal to or greater than a third predetermined threshold value, a current angular position being the angular position at which the current identifier is received.

8. The method as claimed in claim 1, in which step a) comprises steps S1 to S4 in which:
at step S1, a check is made as to whether or not the identifier forming part of a received current message is received for the first time since the start of the process,
if it is the first time, at step S2, the identifier is memorized in association with the instant at which it was received and the number count "nt" is incremented by one for said identifier; in addition a further count of the number "nID" of different identifiers received is then memorized; if the identifier which is received with a message is not received for the first time during the process then,
at step S3, the number count "nt" of said identifier is incremented by "one", and the instant at which said identifier was received is memorized,
steps S1 to S3 continue until the end of the predetermined duration, said end of the predetermined duration being verified at step S4 and beginning at step b) when the predetermined duration has elapsed.

9. A device for determining identifiers (ID) of wheel units of a vehicle and positions relative to the vehicle of the wheels on which said wheel units are fitted, the vehicle being equipped with a speed sensor for each wheel, each wheel unit being equipped with means for transmitting at a predetermined angular position of the corresponding wheel around its axis a message including the identifier of the wheel unit, a central processing unit receiving said message and information from said speed sensors,
characterized in that it comprises:
a) a means of counting, for each identifier, of a number "nt" of receptions of said identifier,
b) a means of statistical processing of the numbers "nt" in order to determine from among all the identifiers received those which are statistically indicated to be the identifier of one of the wheel units of the vehicle, the identifiers becoming candidate identifiers for the vehicle, the statistical process ending when the number of candidate identifiers is at least equal to the number of vehicle wheels, and
c) a means of determining that the candidate identifier is the identifier of a particular wheel unit if said candidate identifier meets a predetermined criterion relating to at least one instant of reception of said candidate identifier and to the angular position of the particular wheel at said instant, and of assigning to the corresponding particular wheel the position relative to the vehicle of the speed sensor supplying said angular position,
wherein the means for determining comprises:
a means cb1), which for each identifier received, makes a check as to whether or not said current received identifier is the candidate identifier; if not, the current received identifier is not processed,
a means cb2) that, when yes in means cb1), determines an angular position of each wheel for the instant at which the current candidate identifier was received, and an angular division of a full interval, −180° to +180°, is consequently selected for each wheel,
a means cb3) that increments a count of each selected division by one in the division of each wheel, the count being dedicated to the current candidate identifier,
a means cb4) that calculates a dispersion value σ1, σ2, σ3, σ4 for each of the constructed histograms by counting the number of identifiers registered in a division,
a means cb5) that establishes a ratio R between the first and the second smallest dispersion value for the current identifier,
a means cb6) that compares the ratio R with a threshold value,
a means cb7) that, if ratio R is equal to or greater than the threshold value, considers the current candidate identifier to be the identifier of the vehicle and the wheel unit responding to said current candidate identifier is positioned at the position corresponding to the smallest dispersion;
a means cb8), that when the ratio R is not equal to or greater than the threshold value, and when it has been decided that the current identifier is the identifier of the vehicle, eliminates the current identifier from the candidate identifiers,
a means cb9) that makes a check as to whether or not the four wheels have been learnt and positioned; if not, continues for the candidate identifiers which have not yet been eliminated as being the identifier of the vehicle and for the wheels which have not yet been located; if yes, terminates the process, and a means cb10) that, if the process is not terminated at the end of a predetermined duration starting at an end by means b), finds that the process has failed.

10. A method for determining identifiers (ID) of wheel units of a vehicle and positions relative to the vehicle of the wheels on which said wheel units are fitted, the vehicle being equipped with a speed sensor for each wheel, each wheel unit being equipped with means for transmitting at a predetermined angular position of the corresponding wheel around its axis (18) a message including the identifier of the wheel unit, a central processing unit receiving said message and information from said speed sensors, said method comprising the following steps:

a) counting, for each identifier, of a number "nt" of receptions of said identifier, b) statistical processing of the numbers "nt" in order to determine from among all the identifiers received those which are statistically indicated to be the identifier of one of the wheel units of the vehicle, the identifiers becoming candidate identifiers for the vehicle, the statistical process ending when the number of the candidate identifiers is at least equal to the number of wheels of the vehicle, and c) determining that each candidate identifier is the identifier of a particular wheel unit if said candidate identifier meets a predetermined criterion relating to at least one instant of reception of said candidate identifier and to the angular position of a particular wheel at said instant, and assigning to the corresponding particular wheel the position relative to the vehicle of the speed sensor supplying said angular position, wherein, at step b)

the identifier is accepted as the candidate identifier if, for said identifier, the number "nt" is greater than a first predetermined threshold value and if the number of different identifiers for which the number "nt" is greater than said first predetermined threshold value is at least equal to the number of vehicle wheels, and wherein at step c), the criterion is:

whether or not the candidate identifier has been received during a predetermined duration starting after the end of step b) as a synchronized identifier a greater number of times than a second predetermined threshold value, the synchronized identifier being an identifier which is received when the corresponding wheel has performed a whole number of revolutions since a last reception of the same identifier.

* * * * *